United States Patent Office 3,025,258
Patented Mar. 13, 1962

3,025,258
COATING COMPOSITION COMPRISING A HEAT CURABLE LIQUID POLYMER OF BUTADIENE AND AN ALUMINATE ESTER
Darrell D. Hicks, Louisville, Ky., assignor to Devoe & Raynolds Company, Inc., a corporation of New York
No Drawing. Filed May 28, 1958, Ser. No. 738,306
5 Claims. (Cl. 260—33.6)

This invention pertains to butadiene resin coating compounds. More particularly the invention relates to a surface coating material adapted for application to metal surfaces. In still another embodiment the invention relates to a coating to be applied to the inside of metal containers in which foods of a corrosive nature are canned.

It is known that anionic and cationic polymerizations of butadiene yield products having structures differing markedly from those of polymers obtained by emulsion methods. While they have tensile strengths and abrasion resistances rendering them desirable for coating metals such as cans, anionic and cationic polymerized butadiene polymers, i.e. homopolymers or copolymers of butadiene do not produce films having high resistance to chemical attack by pork, corn, sour cherries, pumpkin and other equally corrosive food substances.

In accordance with this invention, however, it has been found that anionic and cationic polymerized butadiene polymers form films having high resistance to such substances as pork and corn if the polymer contains certain aluminum hydroxide derivatives. By anionic and cationic polymerized butadiene polymers is meant polymers of butadiene, or of butadiene with styrene, vinyl toluene, methoxystyrene, etc. wherein the polymerization is initiated by means of ions. Such polymerizations are generally carried out in solution using a liquid hydrocarbon diluent. Friedel-Crafts catalysts such as $AlCl_3$ or $BF_3$ are generally used in cationic polymerizations whereas alkali, alkali-organo and Ziegler catalysts are employed in anionic polymerizations. Copolymers generally contain a minor amount of the vinyl aromatic monomer, i.e. less than fifty percent, preferably less than thirty-five percent generally about twenty percent. Generally molecular weights of ionic polymerized butadiene polymers are not as high as those obtained by emulsion and other polymerization methods. The polymers are liquid homopolymers and copolymers having molecular weights in the range of 1,000 to 10,000. Adducts formed by the reaction of these polymers with about one percent maleic anhydride or citraconic anhydride are also desirable polymers.

Aluminum hydroxide derivatives employed in accordance with this invention are incorporated in the liquid polymer in amounts of one to ten percent based on resin solids, preferably four to five percent. If desirable, the viscosity of the liquid polybutadiene polymer can be reduced by the addition of a hydrocarbon solvent for ease in film application. The aluminum hydroxide derivatives within the contemplation of the invention are aluminum alcoholates and aluminum acylates each having four to eighteen carbon atoms. The preferred alcoholates and acylates are those bound to the aluminum atom through both a primary valence or chemical bond, and also through a secondary valence or coordinate bond to form a chelate. These compounds will be referred to herein as aluminum chelates. Included among the aluminum chelates are acetoacetic esters such as aluminum diisopropyl monoethylacetoacetate and aluminum isopropyl diethylacetoacetate, glycol aluminates such as the octylene glycol aluminates, triethanol amine aluminates, aluminum lactate, aluminum monoisopropylate di(2-ethylhexanediol-1,3), etc. Other acylates and alcoholates are aluminum diisopropylate monooleate, aluminum di(sec butoxide) monooleate, and the aluminum hexylates for example aluminum tri-2-ethylhexoxide. The aluminum butylates, the aluminum stearylates, hydroxyaluminum stearate, isopropoxyaluminum stearate, hydroxyaluminum oleate, isopropoxyaluminum oleate, hydroxyaluminum soy acylate and the like.

In carrying out the invention the liquid polybutadiene polymer and the aluminum acylate or alcoholate are merely combined to form the film forming composition. However, in many instances it will be desirable to incorporate the aluminum alcoholate or acylate in a solvent for the butadiene polymer. Suitable solvents are hydrocarbons boiling in the range of 170° F. to 400° F., such as naphtha, mineral spirits (a petroleum distillate having a boiling range of 312° F. to 389° F.), kerosene, monohydric alcohols, toluene and xylene. It is emphasized that since many of the aluminum alcoholates and acylates, particularly the aluminum chelates are readily hydrolyzable the solvent should be practically anhydrous. The resulting film forming composition can then be sprayed, brushed or rolled onto the metal surface. The film is then heat cured for a period of a few minutes to an hour, a temperature of 350° F. to 400° F. generally being sufficient.

The advantages of the use of aluminum alcoholates and acylates will be more fully understood by referring to data illustrating the expedient of making such additions to butadiene polymers. The examples are given by way of illustration, however, and not of limitation. The parts are by weight.

The butadiene polymers employed in the following tests are ionic polymerized homopolymers and copolymers of butadiene-1,3. Butadiene Homoploymer A is a sodium catalyzed liquid homopolymer of butadiene-1,3 having a molecular weight of approximately 1500, a specific gravity of about 0.91 and about 0.8 double bond per $C_4$ unit. Such homopolymers are available commercially as "Butarez 15," "Butarez 25" etc. of Phillips Petroleum Company. Butadiene Copolymer A is a liquid copolymer of butadiene-1,3 and styrene containing approximately 20 percent styrene, and containing about twenty percent less unsaturation than the homopolymer. Its specific gravity is 0.91 and its molecular weight is approximately 2000. Such copolymers are commercially available as for example E-11 from Standard Oil Company of New Jersey. Butadiene Homopolymer B and Butadiene Copolymer B are maleic modified polymers of the "A" type, also in commercial production. Homopolymer A, or Copolymer A, is reacted with about one percent by weight maleic anhydride, the polymer and maleic being combined and heated to a temperature of about 380° F. to form the maleic adduct of an "A" polymer (the adduct being referred to herein as Homopolymer B or Copolymer B).

EXAMPLE 1

60 parts of a 60 percent solids solution of Butadiene Copolymer B and 1.8 parts (5% based on solids) of aluminum diisopropyl monoethylacetoacetate are mixed in a conventional manner and 38 parts of "Solvesso 100"[1] are added to thin the fluid to roll-coating viscosity. The resin solution is roll-coated on electrolytically tinned plates, the plates being baked 11 minutes at 400° F. forming films having dry film weights of 2.75 mg./in.[2] and 0.5 mg./in.[2] The resulting plates are fabricated into can ends and the film tested. The film is outstanding in its sulfide stain resistance with no loss of adhesion as will be amply demonstrated.

The suitablility of various coating compositions, such as those prepared according to this invention, for use as

---

[1] "Solvesso 100" is an aromatic hydrocarbon derived from the distillation of petroleum, having a flash point (Tag closed cap) of 100° F. and a boiling range of 315°–350° F.

can coatings is indicated by pork and corn processing tests. To determine film resistance to pork or corn in processing, fresh ground pork, or yellow cream style corn, is placed in a container and the fabricated can is immersed in the pork or corn. The container is then placed in a pressure cooker containing 3 to 4 inches of water. The pork, or corn, is then cooked under pressure for 2 hours, 10 p.s.i.g. and 240° F. being used for corn, and 15 p.s.i.g. and 250° F. being used for pork. Adhesion after pork and corn processing is determined by cross-scribing with a pocketknife and pulling off cellophane tape. One inch width tape is applied to the panel with as much thumb pressure as can be exerted, and then removed with a quick, vigorous pull.

The suitability of coating compositions for interior can coatings and other uses such as primers for household appliances, is also determined by Wedge Bend and Gardner Impact (28 in. ft. lbs.) tests, Scorch Resistance (dipped in solder 660° F. for 15 minutes), Boiling Water, and Can End Fabrication (followed by dipping in copper sulfate solutions 2 minutes and subsequent inspection of bends).

In the following table are tabulated results of the tests made on the film forming composition of Example 1. In this table, as well as in subsequent tables, a comparison is made with the same film forming composition but without the 5 percent aluminum alcoholate or acylate. The composition without the aluminum alcoholate or acylate is referred to merely as the polymer, e.g. "Homopolymer A" although the composition may contain a solvent. Thus Butadiene Copolymer B will be the film forming composition corresponding to the Butadiene Copolymer B with the 5 percent aluminum alcoholate or acylate. If the film forming composition of the invention is thinned with a solvent the corresponding standard will also have been thinned with a solvent

*Table of Results*

[Rating: 10 Excellent to 0 Failure]

| Test | Film forming composition | | | |
|---|---|---|---|---|
| | Butadiene copolymer B | | Butadiene copolymer B [1] 5% aluminum chelate | |
| Film Weight mg./in.² | 2.75 | 5.0 | 2.75 | 5.0 |
| Copper sulfated can end fabrication | 10 | 10 | 10 | 10 |
| 1 hr. at 280° F. dry heat | 10 | 10 | 10 | 10 |
| Boiling water: | | | | |
| A. Blush | 10 | 10 | 10 | 10 |
| B. Adhesion | 10 | 10 | 10 | 10 |
| Pork processing: | | | | |
| A. Stain | 6 | 6 | 10 | 9 |
| B. Adhesion | 10 | 10 | 10 | 10 |
| Corn processing: | | | | |
| A. Stain | 10 | 9 | 10 | 10 |
| B. Adhesion | 10 | 10 | 10 | 10 |
| Wedge bend | .2 | 3 | 3 | 5 |
| Gardner impact 28" lb | .6 | 8 | 6 | 8 |
| Scorch resistance | | 7 | | 7 |

[1] Composition of Example 1.

The foregoing results adequately illustrate not only that the compositions of this invention have properties rendering them eminently suitable for coatings, but that other properties are also outstanding affording application of the film forming compositions of the invention to other uses.

As indicated hereinbefore the aluminum chelates constitute a particularly important class of aluminum alcoholates and acylates within the contemplation of this invention. In the following table is shown the marked improvment in stain resistance obtained through the use of aluminum chelates.

*Table of Results*

PORK AND CORN PROCESSING
[Rating: 10 Excellent to 0 Failure]

| Film-forming composition | Boiling water | Corn processing 2 hrs., 10 p.s.i.g. at 240° F | | Pork processing 2 hrs., 15 p.s.i.g. at 250° F. | |
|---|---|---|---|---|---|
| | | Stain | Adhesion | Stain | Adhesion |
| Butadiene homopolymer A [1] | 10 | 8 | 0 | 3 | 10 |
| Butadiene homopolymer A,[2] 5% aluminum chelate | 10 | 10 | 10 | 9 | 10 |
| Butadiene copolymer A [3] | 10 | 9 | 10 | 6 | 10 |
| Butadiene copolymer A,[4] 5% aluminum chelate | 10 | 10 | 10 | 10 | 10 |
| Butadiene copolymer A,[5] plus copolymer B | 10 | 9 | 10 | 6 | 10 |
| Copolymer A plus copolymer B,[6] 5% aluminum chelate | 10 | 10 | 10 | 10 | 10 |
| Copolymer A plus copolymer B,[7] 5% aluminum chelate | 10 | 10 | 10 | 9 | 10 |

[1] 20 parts butadiene homopolymer A, 20 parts xylene.
[2] 20 parts butadiene homopolymer A, 20 parts xylene, 1 part aluminum diisopropyl mono ethylacetoacetate.
[3] 40 parts butadiene copolymer A, 60 parts mineral spirits.
[4] 40 parts butadiene copolymer A, 38 parts mineral spirits, 2 parts aluminum diisopropyl mono ethylacetoacetate.
[5] 30 parts butadiene copolymer A, 10 parts butadiene copolymer B, 60 parts mineral spirits.
[6] 32 parts butadiene copolymer A, 8 parts butadiene copolymer B, 58 parts mineral spirits, 2 parts aluminum diisopropyl mono ethylacetoacetate.
[7] 35.5 parts butadiene copolymer A, 6 parts butadiene copolymer B, 55 parts mineral spirits, 4 parts 50% solution of aluminum isopropyl diethylacetoacetate.

In the coating of electrolytically tinned plates it has been found that stain and adhesion properties vary with different electropositive tinned plates, specifically properties are affected by the type of bright dip following the electrolytic tinning process, i.e. whether a dichromate, chromic acid or chromic phosphate dip is used. Wedge bend, for instance is better when a chromic acid dip is used. Hence it will be observed that in the following table results given for Homopolymer A and Copolymer A used as standards do not give the same results as are set forth for these polymers in foregoing tables. The particular tin plate in this instance is not improved to the same degree by coating with these polymers. It will be noted, however, that when alcoholates or acylates are used in accordance with this invention even the adhesion of the film to this type of tin plate is improved as shown in the following table.

*Table of Results*

PORK PROCESSING
[2 hours, 15 p.s.i.g. at 250° F. Rating: 10 Excellent to 0 Failure]

| Film Forming Composition | Stain | Adhesion |
|---|---|---|
| Butadiene homopolymer A [1] | 0 | 0 |
| Butadiene homopolymer A,[2] 5% aluminum acylate | 2 | 5 |
| Butadiene homopolymer A,[3] 5% aluminum alcoholate | 3 | 10 |
| Butadiene copolymer A [4] | 0 | 5 |
| Butadiene copolymer A,[5] 5% aluminum acylate | 3 | 7 |
| Butadiene copolymer B [6] | 0 | 5 |
| Butadiene copolymer B,[7] 5% aluminum chelate | 8 | 10 |
| Butadiene copolymer B,[8] 5% aluminum acylate | 9 | 10 |

[1] 20 parts butadiene homopolymer A, 20 parts xylene.
[2] 20 parts butadiene homopolymer A, 20 parts xylene, 1.1 parts aluminum tri-2 ethyl hexoxide (90% solids).
[3] 20 parts butadiene homopolymer A, 20 parts xylene, 2 parts aluminum di (sec. butoxide) monooleate (50% solids).
[4] 20 parts butadiene copolymer A, 20 parts xylene.
[5] 20 parts butadiene copolymer A, 20 parts xylene, 2 parts aluminum di (sec. butoxide) monooleate (50% solids).
[6] 33.3 parts butadiene copolymer B, 6.7 parts xylene.
[7] 33.3 parts butadiene copolymer B, 6.7 parts xylene, 2.0 parts aluminum monoisopropylate di (2 ethyl hexanediol 1,3) (50% solids).
[8] 33.3 parts butadiene copolymer B, 6.7 parts xylene, 2.0 parts aluminum diisopropylate monooleate (50% solids).

What is claimed is:

1. A coating composition for internally coated metal containers in which foods of a corrosive nature are hot processed which comprises:

I. a heat curable liquid polymer of butadiene-1,3 having a molecular weight of 1,000 to 10,000 and selected from the group consisting of
A. homopolymers of butadiene-1,3,
B. copolymers of butadiene-1,3 with an ethylenically unsaturated monomer copolymerizable therewith, and
II. an aluminate ester in which a hydroxyl group of aluminum hydroxide has been replaced with a substituent selected from the group consisting of alkoxy and acyl groups each having four to eighteen carbon atoms, said aluminuate ester being present in the coating composition,
  a. in an amount sufficient to confer on the cured film produced improved resistance to food corrosion during the hot processing,
  b. the amount being in the range of 1 to 10 weight percent.

2. The coating composition of claim 1 wherein the aluminum hydroxide derivative is an ethyl acetoacetate.

3. The coating composition of claim 1 wherein the aluminum hydroxide derivative is a glycol aluminate.

4. The coating composition of claim 1 wherein the aluminate ester is aluminum diisopropyl monoethylacetoacetate.

5. A coating composition for the inner surface of cans in which meats, fruits, vegetables and beverages are hot processed which comprises:

I. a heat curable liquid polymer of butadiene-1,3 having a molecular weight of 1,000 to 10,000 and selected from the group consisting of
  A. homopolymers of butadiene-1,3, and
  B. copolymers of butadiene-1,3, with an ethylenicaly unsaturated monomer copolymerizable therewith, said liquid polymer being in solution in
II. a hydrocarbon solvent boiling in the range of 170° F. to 400° F., the polymer solution having incorporated therein,
III. an aluminate ester in which a hydroxyl group of aluminum hydroxide has been replaced with a substituent selected from the group consisting of alkoxy and acyl groups each having four to eighteen carbon atoms, said aluminate ester being incorporated in the composition,
  a. in an amount in the range of 1 to 10 percent,
  b. sufficient to confer on the film produced a resistance to staining and corroding during the hot processing.

References Cited in the file of this patent
UNITED STATES PATENTS
2,874,146   Deverell-Smith et al. ____ Feb. 17, 1959
FOREIGN PATENTS
612,697   Great Britain _____ Nov. 16, 1948